United States Patent
Takeuchi et al.

(10) Patent No.: US 9,069,556 B2
(45) Date of Patent: Jun. 30, 2015

(54) IMAGE PROCESSING APPARATUS FOR DELAYING A SCHEDULED SLEEP MODE FOR A SPECIFIC PROCESS

(71) Applicant: FUJI XEROX CO., LTD., Tokyo (JP)

(72) Inventors: Yuri Takeuchi, Kanagawa (JP); Kazuhiko Narushima, Kanagawa (JP); Koichi Azuma, Kanagawa (JP); Kenji Kuroishi, Kanagawa (JP); Masafumi Ono, Kanagawa (JP); Motofumi Baba, Kanagawa (JP); Tsutomu Nakaminato, Kanagawa (JP); Keiko Shiraishi, Kanagawa (JP); Hidenori Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/058,818

(22) Filed: Oct. 21, 2013

(65) Prior Publication Data
US 2014/0313536 A1    Oct. 23, 2014

(30) Foreign Application Priority Data

Apr. 18, 2013 (JP) .................................. 2013-087458

(51) Int. Cl.
| G06K 15/00 | (2006.01) |
| G06F 1/32 | (2006.01) |
| H04N 1/00 | (2006.01) |

(52) U.S. Cl.
CPC .......... *G06F 1/3296* (2013.01); *H04N 1/00896* (2013.01)

(58) Field of Classification Search
CPC .......... H04N 1/00896; H04N 1/00885; H04N 1/00888; G06F 3/1221; G06K 15/4055
USPC ........................................................ 358/1.14
See application file for complete search history.

(56) References Cited

U.S. PATENT DOCUMENTS

| 8,089,645 B2 * | 1/2012 | Soda ............................. 358/1.14 |
| 2006/0274348 A1 * | 12/2006 | Suzuki ......................... 358/1.13 |
| 2008/0112005 A1 * | 5/2008 | Murray et al. ................ 358/1.15 |
| 2008/0144070 A1 * | 6/2008 | Mori et al. .................... 358/1.13 |
| 2008/0297837 A1 * | 12/2008 | Soda ............................. 358/1.15 |
| 2010/0149576 A1 * | 6/2010 | Morihara ...................... 358/1.13 |
| 2010/0315665 A1 * | 12/2010 | Ebisui ........................... 358/1.14 |
| 2012/0026524 A1 * | 2/2012 | Sekido et al. ................. 358/1.13 |
| 2012/0076523 A1 * | 3/2012 | Kojima ............................. 399/70 |
| 2012/0137150 A1 * | 5/2012 | Yokokura ...................... 713/320 |
| 2012/0229831 A1 * | 9/2012 | Kuroishi et al. .............. 358/1.13 |
| 2013/0250337 A1 * | 9/2013 | Inoue ............................ 358/1.13 |
| 2014/0025974 A1 * | 1/2014 | Suwabe ......................... 713/323 |
| 2014/0240739 A1 * | 8/2014 | Hattori .......................... 358/1.13 |

FOREIGN PATENT DOCUMENTS

JP       A-2010-041307       2/2010

* cited by examiner

*Primary Examiner* — Benjamin O Dulaney
(74) *Attorney, Agent, or Firm* — Oliff PLC

(57) ABSTRACT

A processing control apparatus includes a processor, a setting unit, and a delay unit. The processor operates by using power supplied from a main power supply, and executes a process on the basis of received information. The setting unit restricts power supply from the main power supply to the processor, and sets a restricted period in which a process is prohibited from being executed in the processor. In the case where a specific process which is being executed when the restricted period is to start will be completed within a predetermined allowed time period, the delay unit delays the time when the restricted period is start at least until the specific process is completed.

9 Claims, 5 Drawing Sheets

IMAGE PROCESSING APPARATUS FOR DELAYING A SCHEDULED SLEEP MODE FOR A SPECIFIC PROCESS

CROSS-REFERENCE TO RELATED APPLICATIONS

This application is based on and claims priority under 35 USC 119 from Japanese Patent Application No. 2013-087458 filed Apr. 18, 2013.

BACKGROUND (i) Technical Field

The present invention relates to a processing control apparatus, an image processing apparatus, and a processing control method.

(ii) Related Art

Image processing apparatuses are provided with an energy saving mode (which may be referred to as a sleep mode) in which power consumption when no processes are being executed is reduced so as to be less than that when processes are being executed.

SUMMARY

According to an aspect of the present invention, there is provided a processing control apparatus including a processor, a setting unit, and a delay unit. The processor operates by using power supplied from a main power supply, and executes a process on the basis of received information. The setting unit restricts power supply from the main power supply to the processor, and sets a restricted period in which a process is prohibited from being executed in the processor. In the case where a specific process which is being executed when the restricted period is to start will be completed within a predetermined allowed time period, the delay unit delays the time when the restricted period is start at least until the specific process is completed.

BRIEF DESCRIPTION OF THE DRAWINGS

Exemplary embodiment of the present invention will be described in detail based on the following figures, wherein.

DETAILED DESCRIPTION

Figure 1:
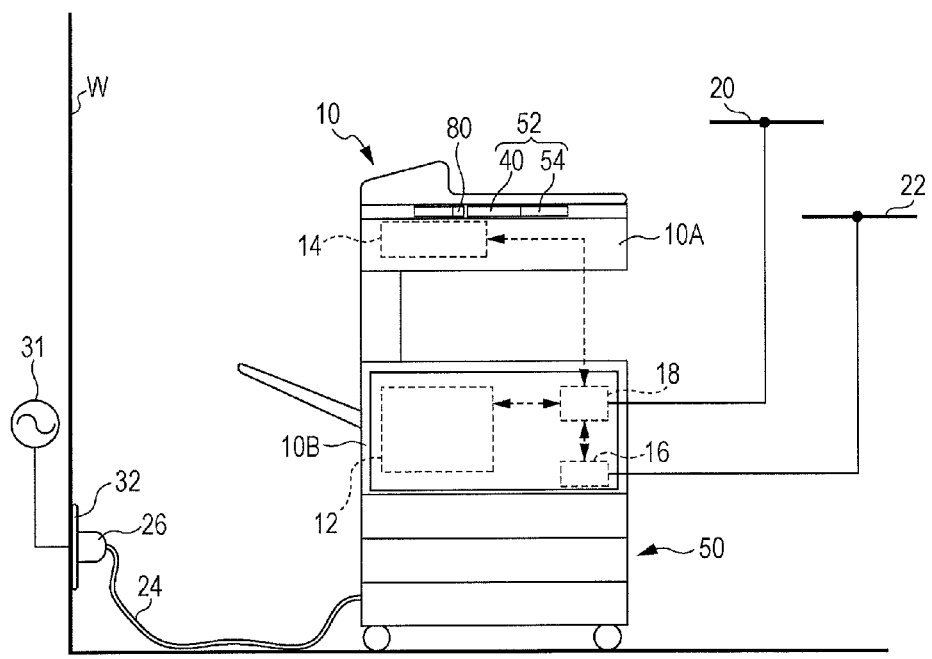
FIG. 1 is a schematic view of an image processing apparatus according to an exemplary embodiment.

FIG. 1 illustrates an image processing apparatus 10 according to one exemplary embodiment.

The image processing apparatus 10 includes an image forming unit 12 which forms an image on recording paper, an image reading unit 14 which reads out a document image, and a facsimile communication control circuit 16. The image processing apparatus 10 includes a main controller 18 which controls the image forming unit 12, the image reading unit 14, and the facsimile communication control circuit 16 so as to, for example, temporarily store image data of a document image which is read out by the image reading unit 14, or to transmit the read-out image data to the image forming unit 12 or the facsimile communication control circuit 16. The image reading unit 14 is covered by an upper housing 10A, and the image forming unit 12, the facsimile communication control circuit 16, and the main controller 18 are covered by a lower housing 10B. A tray unit 50 having multiple trays which accommodate recording paper is provided underneath the lower housing 10B.

On the front side of the top surface of the upper housing 10A covering the image reading unit 14, a user interface 52 (hereinafter may be referred to as a "UI 52") is disposed. The UI 52 is used to provide an instruction to perform one of operations (services) including an image reading process, a copying process, an image forming process, and a transmission/reception process, and an instruction to perform detailed settings for each of the operations, as well as to display the state of the image processing apparatus 10. The UI 52 includes a touch panel 40 which enables instructions to be transmitted by touching the display screen with an operator's finger or the like, and hardkeys 54 which enable instructions to be transmitted through mechanical operations, such as a pressing operation.

A subpanel 80 is disposed adjacent to the touch panel 40. According to the exemplary embodiment, the subpanel 80 functions as a user interface which does not belong to and is independent of the UI 52.

The main controller 18 is connected to a communication network 20 such as the Internet, and the facsimile communication control circuit 16 is connected to a telephone network 22. The main controller 18 is connected to, for example, a host computer via the communication network 20, and serves as a unit which receives image data and which performs facsimile reception/transmission via the facsimile communication control circuit 16 by using the telephone network 22.

The image reading unit 14 includes a document platen for positioning a document, a scanning drive system which emits light to scan an image of a document on the document platen, and a photoelectric conversion element such as a charge coupled device (CCD) which receives reflected or transmitted light produced through scanning performed by the scanning drive system to convert the received light into an electric signal.

The image forming unit 12 includes a photoconductor, around which the following units are disposed: a charging apparatus which evenly charges the photoconductor; a scanning exposure unit which performs scanning with light beams on the basis of image data; an image developing unit which develops an electrostatic latent image formed through scanning and exposure performed by the scanning exposure unit; a transfer unit which transfers a developed image on the photoconductor onto recording paper; and a cleaning unit which cleans the surface of the photoconductor after transfer. A fuser which fixes an image on recording paper after transfer is disposed on a conveying path of the recording paper.

In the exemplary embodiment, the image forming unit 12, the image reading unit 14, and the facsimile communication control circuit 16 (hereinafter may be collectively referred to as "devices") are used to enable services (processing patterns) including scanning, copying, printing, facsimile transmission, facsimile reception, and printing after reception, to be performed.

In the image processing apparatus 10, a plug 26 is attached at the end of an input power line 24. By connecting the plug 26 to a wall outlet 32 for a commercial power supply 31 for which wiring is provided to a wall W, the image processing apparatus 10 is supplied with power from the commercial power supply 31.

UI 52 and Subpanel 80

Figure 2:
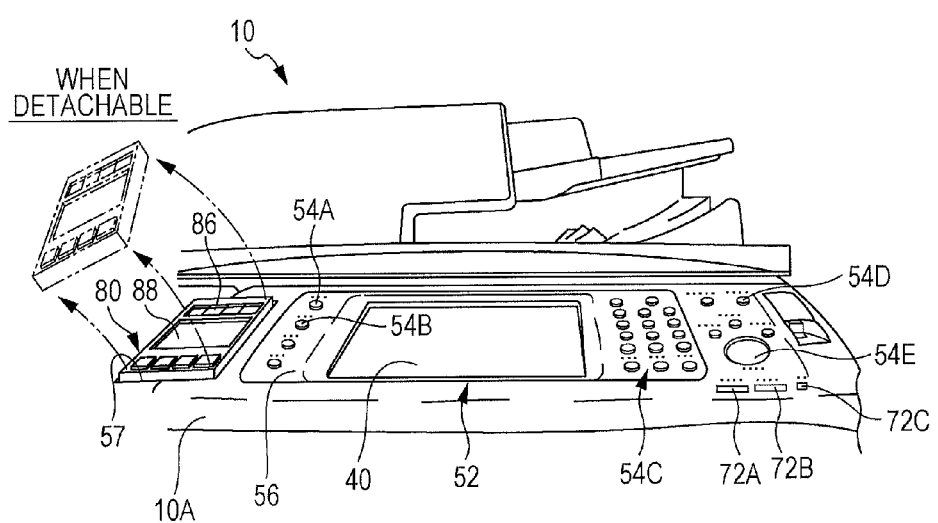
FIG. 2 is an enlarged view of a user interface and its surrounding area in the image processing apparatus according to the exemplary embodiment.

As illustrated in FIG. 2, the UI 52 installed on the upper housing 10A is disposed on a plate 56 which is a member different from the upper housing 10A. The touch panel 40 is disposed in a center portion of the plate 56. Hardkeys 54A to 54E (which have been collectively referred to as hardkeys 54, in FIG. 1) are disposed in portions of the surface of the plate 56 which are located on the left and right sides of the touch panel 40 in FIG. 2.

Each of the hardkeys 54A to 54E is used to specify predetermined instruction information through a pressing operation. For example, the menu key 54A is used to cause the display screen of the touch panel 40 to transition to the main menu screen. The copy key 54B is used to specify a copy operation. The numerical keypad 54C is used to specify the number of copies or input a PIN code. The power-saving key 54D is used to go into or out of the power-saving mode. The start key 54E is used to provide an instruction to execute a process.

A light-emitting diode (LED) 72A for indicating data transmission, an LED 72B for indicating an error alert, and an LED 72C for indicating a power-on state are disposed as LEDs for monitoring, in a portion which is located on the lower right side of the plate 56 in FIG. 2 and which is near the start key 54E.

The subpanel 80 is disposed on the left side of the plate 56 in FIG. 2. In the exemplary embodiment, the subpanel 80 is housed in a recess 57 having a rectangular shape which is disposed on the upper housing 10A.

The subpanel 80 is provided with a display unit 88 disposed on the surface (as illustrated in FIG. 2, which is the top surface when the subpanel 80 is housed in the recess 57) of a covering member covering the entire subpanel 80.

The subpanel 80 may be housed in the recess 57 so as to be fixed to or detachable from the recess 57 (see the subpanel 80 drawn with imaginary lines in FIG. 2). In the case where the subpanel 80 is detachable, the wiring system corresponding to a bus 33E (see FIG. 3) controlling information communication between the subpanel 80 and the image processing apparatus 10 may be wired or wireless.

The position at which the subpanel 80 is disposed is not limited to this, and the subpanel 80 may be disposed not only around the UI 52 but also at any position, such as a position on the upper housing 10A or on the lower housing 10B. However, it is desirable to select a position viewed by a user easily. In the case where the subpanel 80 is detachable, multiple temporary housing locations for the subpanel 80 may be provided.

The reason why the subpanel 80 is provided separately from the UI 52 in the exemplary embodiment is that the power supply source of the subpanel 80 is different from that of the UI 52. Even when power supply to the UI 52 is interrupted, the subpanel 80 receives power supply from another power system, and provides a notification. The notification to be provided will be described below.

Control System of Image Processing Apparatus

Figure 3:
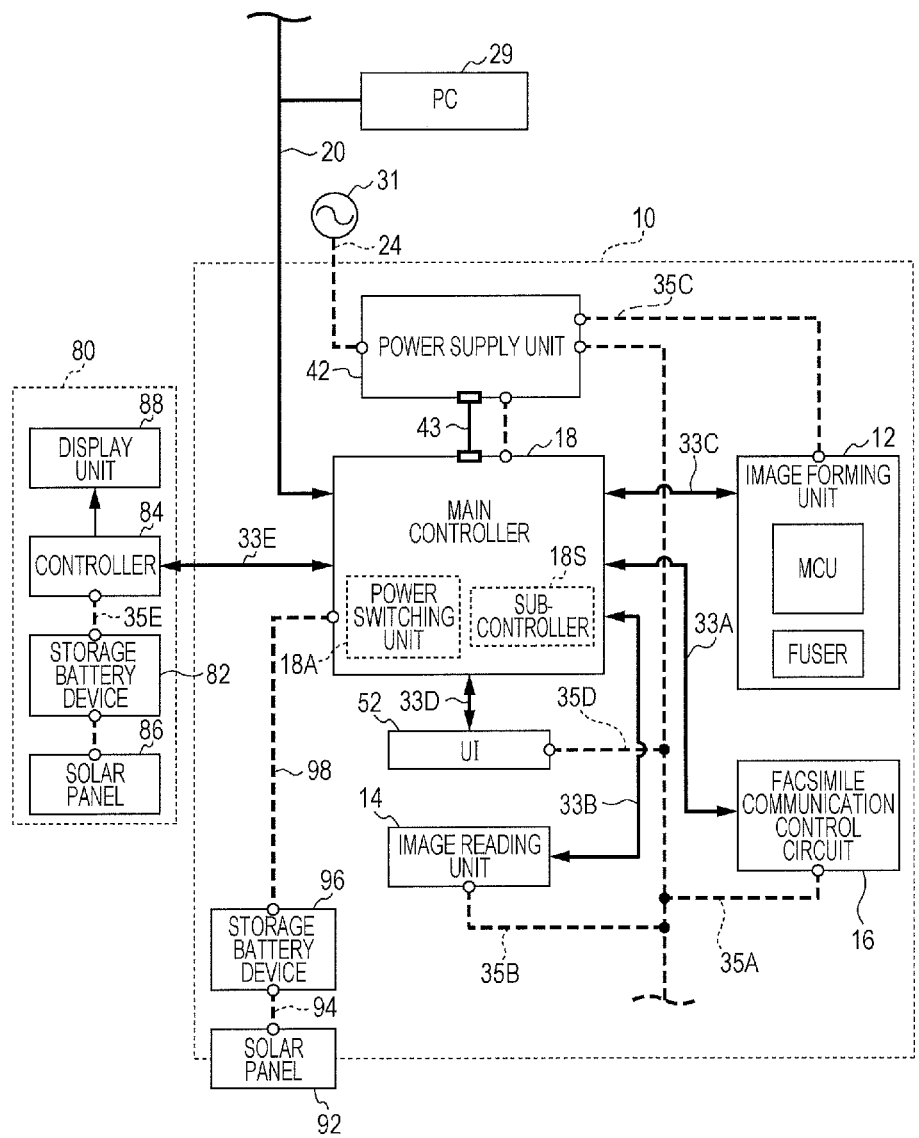
FIG. 3 is a block diagram illustrating a control system of the image processing apparatus according to the exemplary embodiment.

FIG. 3 is a schematic diagram illustrating the hardware configuration of the control system of the image processing apparatus 10.

The communication network 20 is connected to the main controller 18 of the image processing apparatus 10. The communication network 20 is connected to a PC (terminal apparatus) 29, for example, from which image data may be transmitted.

The main controller 18 is connected to the facsimile communication control circuit 16, the image reading unit 14, the image forming unit 12, and the UI 52 via buses 33A to 33D, respectively, such as a data bus or a control bus. That is, the main controller 18 largely controls the processing units in the image processing apparatus 10.

The main controller 18 in the exemplary embodiment is connected to a controller 84 of the subpanel 80 via the bus 33E.

The image processing apparatus 10 is provided with a power supply unit 42 which is connected to the main controller 18 through a signal harness 43.

The power supply unit 42 is supplied with power from the commercial power supply 31 via the input power line 24.

The power supply unit 42 is provided with power supply lines 35A to 35D for supplying power to the main controller 18, the facsimile communication control circuit 16, the image reading unit 14, the image forming unit 12, and the UI 52 independently from each other. Thus, the main controller 18 achieves individual power supplies (in the power supply mode) or individual power supply restrictions (in the energy saving mode) for the respective processing units (devices), enabling so-called partial power-saving control.

In a typical energy saving mode, power supply to devices other than the main controller 18 is interrupted, and power supply other than that required for a function of waiting for reception of information from the outside (from the communication network 20 or the telephone network 22) is interrupted in the main controller 18. In this case, a power of about 1.5 w to 5 w is consumed.

In contrast, in the exemplary embodiment, a "sleep 0" mode in which power supply to the main controller 18 is interrupted as a rule is employed as an energy saving mode.

The phrase "power supply is interrupted as a rule" means that, whereas being supplied with no power from the commercial power supply 31 (power supply unit 42), the main controller 18 is supplied with power from a sub power supply which is different from the power supply unit 42 which is a main power supply, in order to perform the function of waiting for reception of information from the outside and to switch back from the "sleep 0" mode to the normal mode. The power consumption in the "sleep 0" mode is about 0.5 w, enhancing the energy-saving characteristic compared with the typical power consumption (1.5 w to 5 w). The display unit 88 of the subpanel 80 is capable of displaying the power consumption amount during the "sleep 0" mode. In this case, when the unit used in display is 1 w, "0 w" is displayed during the "sleep 0" mode.

In the "sleep 0" mode, for example, print information from the PC 29 and facsimile reception information to the facsimile communication control circuit 16 are received. Even when a time period during which the "sleep 0" mode is on is set, such a job may be executed during in the "sleep 0" mode period.

The "sleep 0" mode period is determined in such a manner that, for example, a time period in which the image processing apparatus 10 is not used often in a day is statistically extracted and that such a time period is set as a restricted period ("sleep 0" mode), enhancing the energy-saving characteristic compared with the case in which the normal mode is continued.

The "sleep 0" mode period is allowed to be set freely by a user. The "sleep 0" mode period is not limited to the above-described single time period, and more than one "sleep 0" mode period in a day may be set. Furthermore, in the case where multiple image processing apparatuses 10 collaboratively control the mode, the transition to the "sleep 0" mode in one image processing apparatus 10 is set so as to be shifted from that in another apparatus, on the basis of the power peak time period information which is transmitted from an electric power company.

In the exemplary embodiment, a power supply system using photovoltaic power generation is employed as the sub power supply for supplying power to the main controller 18 during the "sleep 0" mode period.

That is, a solar panel 92 is disposed for the image processing apparatus 10. The solar panel 92 may be attached to, for example, the entirety or a part of the surfaces of the upper housing 10A and the lower housing 10B (see FIG. 1), or may be disposed separately from the image processing apparatus 10.

The solar panel 92 is connected to a storage battery device 96 via a dedicated line 94. Power stored in the storage battery device 96 is allowed to be transmitted to the main controller 18 via a power supply line 98.

The main controller 18 includes a power switching unit 18A and a sub-controller 18S. The power switching unit 18A switches the power supply source to the power supply unit 42 (main power supply) in the normal mode, and switches the power supply source to the storage battery device 96 (sub power supply) in the "sleep 0" mode.

The sub-controller 18S performs some of the functions of the main controller 18, and operates during the "sleep 0" mode period to execute programs of monitoring the operation state of the power-saving key 54D, waiting for reception of information from the outside as described above, and switching back from the "sleep 0" mode to the normal mode.

The sub-controller 18S may be provided separately from the main controller 18.

The image processing apparatus 10 in the exemplary embodiment is provided with the subpanel 80.

As illustrated in FIG. 3, the subpanel 80 includes a storage battery device 82 which is dedicated to the subpanel 80 and which is connected to the controller 84 via a power supply line 35E. The storage battery device 82 is charged through photovoltaic power generation caused by a solar panel 86.

The subpanel 80 includes the display unit 88 which operates under the control of the controller 84.

A liquid crystal display without backlighting is used as the display unit 88 so as to achieve the minimum power consumption available in the present situation. The display unit 88 with backlighting or an LED display unit may be used depending on the storage capacity of the storage battery device 82 or the power generation capability of the solar panel 86. Furthermore, a touch panel display having manipulation functions may be used.

As described above, the subpanel 80 is not supplied with power from the image processing apparatus 10, and operates by using power from a power source (storage battery device 82) provided separately. The subpanel 80 serves as an information display apparatus which displays information (largely power value information) on the display unit 88 on the basis of the operation information, such as execution information of the devices and operation mode (state) information, received from the main controller 18 via the bus 33E.

Correspondence Between "Sleep 0" Mode and Reception of Outside Information

According to the exemplary embodiment, in a predetermined period, when some process is being executed when the "sleep 0" mode period is to start, the time when the process ends is calculated. If the process ends within a predetermined allowed time period, the transition to the "sleep 0" mode is delayed until the process ends. If the process does not end within the predetermined allowed time period, the process is forced to be interrupted so that the transition to the "sleep 0" mode is performed.

The predetermined period, for example, may be a regular everyday period (time period), or may be an irregular period (time period). Examples of an irregular period include a period which is set by a user, and a period in which peak power in an electric power company appears.

The allowed time period is desirably, for example, about five minutes starting from the beginning of the "sleep 0" mode period, but is not limited to this. If the allowed time period is short, the energy-saving characteristic is given a high priority. If the allowed time period is long, user convenience is given a high priority. The allowed time period may be set as appropriate depending on the operating environment of a user.

The allowed time period may depend on a user ID (identifier). An allowed time period may be set for each user ID. For example, a long allowed time period is set for managers in an organization, and a short allowed time period is set for the other members.

The process which has been forced to be interrupted restarts when the "sleep 0" mode period ends.

When the "sleep 0" mode period is to start during reception of print information (job data), determination is performed as follows. If it is possible to complete the reception of the print information within the allowed time period, the reception is continued. If it is not possible to complete the reception within the allowed time period, a notification that the remaining information is to be transmitted after the "sleep 0" mode period ends is transmitted to the PC 29, from which the print information is transmitted, and the "sleep 0" mode period starts.

In the above description, information received from the outside is a print instruction from the PC 29. Alternatively, this may be applied to facsimile reception and printing of the received data performed in the facsimile communication control circuit 16.

The operation in the exemplary embodiment will be described below.

Figure 4:
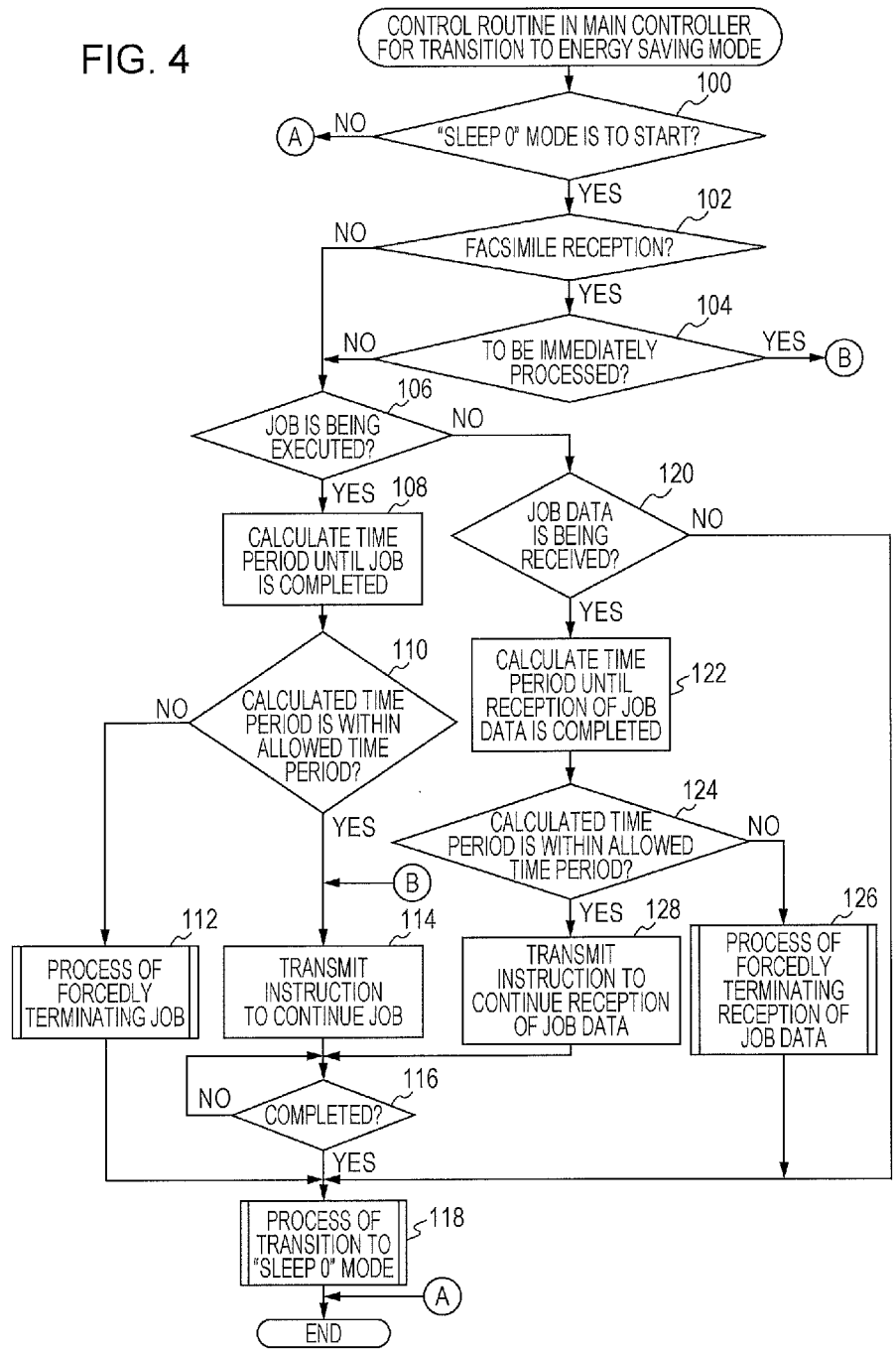
FIG. 4 is a flowchart of a routine of controlling transition to the energy saving mode, in a main controller.

FIG. 4 is a flowchart of a routine of controlling transition to the energy saving mode ("sleep 0" mode), in the main controller 18.

In step 100, the main controller 18 determines whether or not the "sleep 0" mode is to start. If the determination result is negative, the routine ends. If the determination result is positive in step 100, the process proceeds to step 102 in which the main controller 18 determines whether or not facsimile reception data has been received. If the determination result is positive in step 102, the process proceeds to step 104 in which the main controller 18 determines whether or not the facsimile reception is to be immediately processed. If facsimile reception data has not been received in step 102, the process proceeds to step 106.

That is, if the main controller 18 determines that facsimile reception data has been received (positive determination result in step 102), and that it is not necessary to process the facsimile reception immediately, the process proceeds to step 106.

If the main controller 18 determines that facsimile reception data has been received (positive determination result in step 102), and determines that it is necessary to process the facsimile reception immediately in step 104, the process proceeds to step 114 described below.

In step 106, the main controller 18 determines whether or not some job is being executed though the "sleep 0" mode is to start.

If the determination result is positive in step 106, the process proceeds to step 108 in which the main controller 18 calculates the time period until the executing job is completed, and the process proceeds to step 110. In step 110, the main controller 18 determines whether or not the time period until the executing job is completed, which is calculated in step 108, is within the allowed time period.

If the determination result is negative in step 110, in order to give a high priority to energy saving, the process proceeds to step 112 in which the job is forced to be terminated, and the process proceeds to step 118. In step 118, transition to the "sleep 0" mode is performed, and the routine ends.

In the process of forcedly terminating a job, for example, when the executing job is a print job, an image forming process performed by the image forming unit 12 is terminated on a page-by-page basis, and the job data corresponding to the remaining pages is stored in a flash memory. In this case, when the mode is switched back from the "sleep 0" mode to the normal mode, an image forming process is performed for the remaining pages, enabling the energy-saving characteristic to be maintained. The data is stored in a flash memory because the processing time of a flash memory for storage is shorter than that of a hard disk.

The termination may be performed not on a page-by-page basis but on a copy-by-copy basis.

If the determination result is positive in step 110, in order to give a high priority to user convenience, the process proceeds to step 114 in which the main controller 18 transmits an instruction to continue the job, and the process proceeds to step 116.

If the determination result is positive in step 104 described above, that is, if facsimile reception data has been received and it is necessary to process the facsimile reception immediately, the process proceeds from step 104 to step 114 in which the main controller 18 transmits an instruction to continue the job regardless of the allowed time period.

In step 116, the main controller 18 determines whether or not the executing job is completed. If the determination result is positive, the process proceeds to step 118. In step 118, transition to the "sleep 0" mode is performed, and the routine ends.

For example, if the executing job is a print job which will be completed within the allowed time period, the time when transition to the "sleep 0" mode is to be performed is delayed until the image forming process is completed for all pages, enabling user convenience to be achieved.

In contrast, if the determination result as to whether or not some job is being executed though the "sleep 0" mode is to start is negative in step 106, the process proceeds to step 120.

In step 120, the main controller 18 determines whether or not job data for some job is being received.

If the determination result is negative in step 120, the process proceeds to step 118 in which transition to the "sleep 0" mode is immediately performed, and the routine ends.

If the determination result is positive in step 120, the process proceeds to step 122 in which the main controller 18 calculates the time period until the reception of the job data which is being executed is completed, and the process proceeds to step 124. In step 124, the main controller 18 determines whether or not the time period until the reception of the job data is completed, which is calculated in step 122, is within the allowed time period.

If the determination result is negative in step 124, in order to give a high priority to energy saving, the process proceeds to step 126 in which the main controller 18 forcedly terminates the reception of the job data, and the process proceeds to step 118.

In step 118, transition to the "sleep 0" mode is performed, and the routine ends.

In a process of forcedly terminating a reception of job data, for example, when the executing job is a print job, data reception is terminated on a page-by-page basis and the data is stored. In this case, when the mode is switched back from the "sleep 0" mode to the normal mode, the job data corresponding to the remaining pages is received, enabling the energy-saving characteristic to be maintained.

If the determination result is positive in step 124, in order to give a high priority to user convenience, the process proceeds to step 128 in which the main controller 18 transmits an instruction to continue the reception of the job data, and the process proceeds to step 116.

The main controller 18 determines whether or not the reception of the job data, which is being executed, is completed in step 116. If the determination result is positive, the process proceeds to step 118. In step 118, transition to the "sleep 0" mode is performed, and the routine ends.

For example, if the executing job is a print job which is to be completed within the allowed time period, the time when transition to the "sleep 0" mode is to be performed is delayed until the reception of the job data is completed for all pages, enabling user convenience to be achieved.

Figure 5:
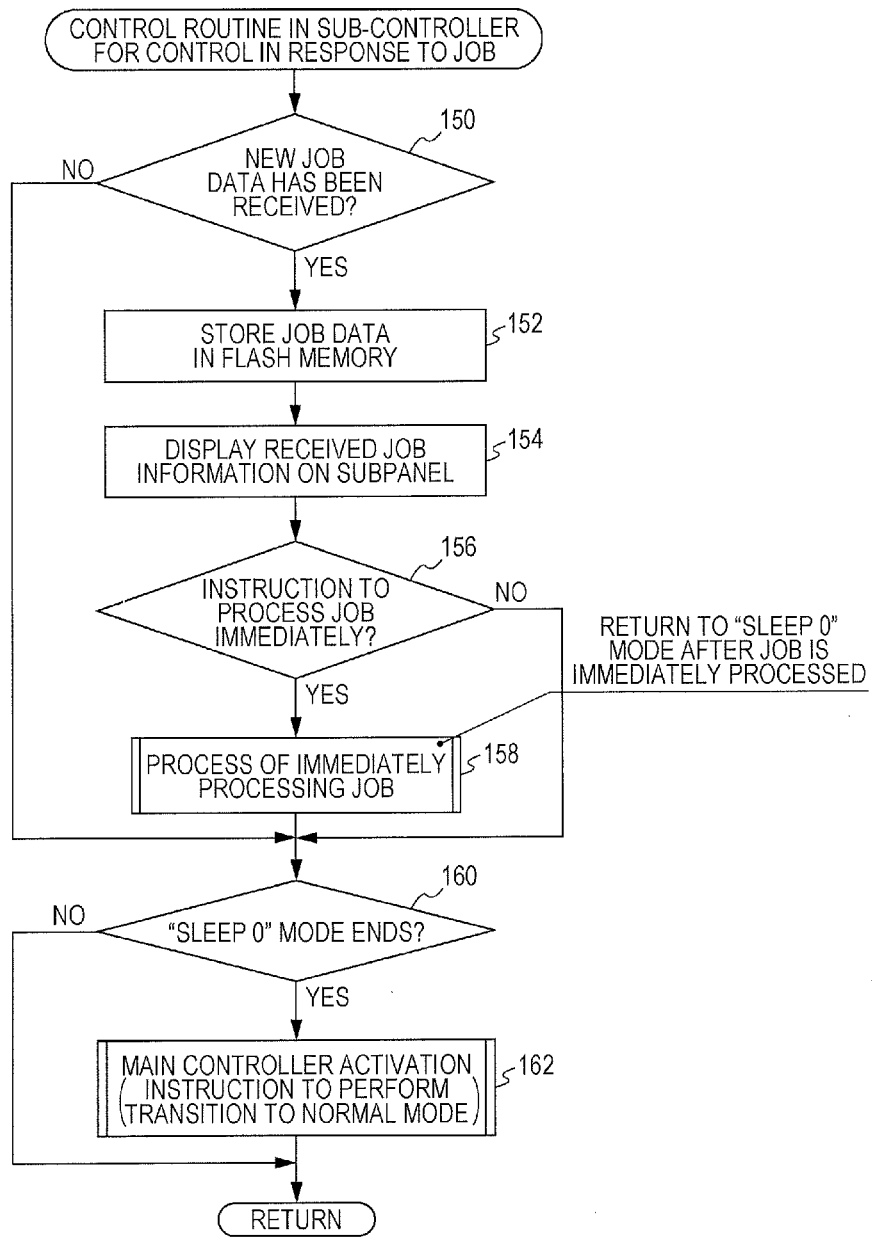
FIG. 5 is a flowchart of a routine of exerting control in response to a job, in a sub-controller.

FIG. 5 is a flowchart of a routine of exerting control in response to a job, in a sub-controller 18S. That is, FIG. 5 illustrates an operation in response to a job received from the outside in the "sleep 0" mode.

In step 150, the sub-controller 18S determines whether or not new job data has been received. If the determination result is positive, the process proceeds to step 152. In step 152, the sub-controller 18S stores the job data in a flash memory, and the process proceeds to step 154.

The job data is stored in a flash memory because the processing time of a flash memory for storage is shorter than that of another recording medium, such as a hard disk. Accordingly, the power consumption of the sub-controller 18S which is activated by using power of the storage battery device 82 is reduced. If the storage battery device 82 is fully charged, the recording medium is not limited to a flash memory.

In the exemplary embodiment, it is assumed that new job data is received. However, no new job data may be received. In this case, it is desirable to transmit a notification that no retry based on a transmission failure is to be performed and that job data is to be retransmitted after the "sleep 0" mode ends, to the PC 29 which is a transmission source (a notification of unnecessary retry and a retransmission reservation notification).

When the flash memory is filled to its storage capacity, remaining data may be processed by using a notification of unnecessary retry and a retransmission reservation notification.

In step 154, the received job information is displayed on the display unit 88 of the subpanel 80, and the process proceeds to step 156.

By displaying the received job information (announcement information) on the subpanel 80, a user is notified of reception of a job without activating the main controller 18.

In step 156, the sub-controller 18S determines whether or not the received job information has an instruction to process it immediately. That is, received job information has an immediate flag. If the immediate flag is on, the determination result will be positive in step 156.

If the determination result is positive in step 156, the sub-controller 18S determines that the received job information is to be printed immediately regardless of the "sleep 0" mode, and the process proceeds to step 158 in which the print process is immediately executed.

In the process which is immediately executed in step 158, for example, the controller 84 of the subpanel 80 recognizes this, and displays announcement information describing that a job necessary to be immediately processed is present, on the display unit 88.

A specific user looks at the announcement information and operates an instruction button (not illustrated) provided on the subpanel 80, thereby activating the main controller 18, and starting up a device after an authentication process for the specific user so as to transmit an instruction to execute the process immediately.

The image processing apparatus 10 executes the process immediately on the basis of the received job information. Then, the mode is switched back to the "sleep 0" mode again, and the process proceeds to step 160.

If the determination result is negative in step 150, the process proceeds to step 160.

In step 160, the sub-controller 18S determines whether or not the "sleep 0" mode ends. If the determination result is positive, the process proceeds to step 162 in which the main controller 18 is activated and in which an instruction to perform transition to the normal mode is transmitted, and the routine ends. If the determination result is negative in step 160, the "sleep 0" mode is maintained, and the routine ends.

When transition to the normal mode is performed, the main controller 18 desirably transfers the information stored in the flash memory in the "sleep 0" mode to a hard disk drive, thereby keeping free space in the flash memory for the next "sleep 0" mode.

It is desirable to process the job which has been forced to be terminated before transition to the "sleep 0" mode or the job data which has been received during the "sleep 0" mode, with priority higher than that for a job received after the mode is switched back to the normal mode.

According to the exemplary embodiment, a period in which the "sleep 0" mode is on (restricted period in which all processes are to be prohibited from being executed) is provided, and a rule to improve energy saving is employed. When a process is being executed when the restricted period is to start, it is determined which operation is to be selected from the following operations depending on a time when the process is completed: an operation in which the time when transition to the "sleep 0" mode is to be performed is delayed and in which the mode is switched after the process is completed; and an operation in which the process is forced to be terminated and in which the mode is switched immediately. Thus, user convenience is taken into consideration in exceptional cases, enabling both of energy saving and user convenience to be achieved.

In the "sleep 0" mode, the display of "0 w" on the subpanel 80 enables a user to recognize that the power consumption is zero with the plug 26 being connected. The plug 26 will not be disconnected, enabling an immediate operation (such as an immediate facsimile reception) to be performed.

In the exemplary embodiment, the restriction on a process corresponding to a print instruction in the "sleep 0" mode period in the energy saving mode is described. The restriction on a process corresponding to a print instruction is not limited to the "sleep 0" mode period, and may be applied to an off-mode period in which the power consumption is less than that in the "sleep 0" mode. Alternatively, the restriction may be applied even in the period in which a typical energy saving mode without using a sub power supply is on.

In the exemplary embodiment, a subpanel 80 is provided on which a notification that the "sleep 0" mode is on is displayed to inform a user. However, it is not necessary to provide the notification using the subpanel 80.

In the exemplary embodiment, the description is made by taking the image processing apparatus 10 as an example. Alternatively, an apparatus may be applied in which a process is executed in response to an instruction from the outside via a communication line and in which an energy saving mode is used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing control apparatus comprising:
   a processor that operates by using power supplied from a main power supply and that executes a process on the basis of received information;
   a setting unit that restricts power supply from the main power supply to the processor and that sets a restricted period in which a process is prohibited from being executed in the processor;
   a delay unit that, in the case where a specific process which is being executed when the restricted period is to start will be completed within a predetermined allowed time period, delays the time when the restricted period is to start at least until the specific process is completed; and
   a restart unit that, in the case where the specific process which is being executed when the restricted period is to start will not be completed within the predetermined allowed time period, restarts a remaining process of the specific process after the restricted period ends, the remaining process being generated on the basis of the prohibition of execution of a process in the processor.

2. The processing control apparatus according to claim 1, wherein the restricted period is a sleep mode period for a sleep mode to which switching is performed from a normal mode and in which the power supplied from the main power supply to the processor is interrupted, and power required to return to the normal mode is supplied from a sub power supply in the sleep mode period.

3. The processing control apparatus according to claim 2, further comprising:
   a storage unit that, in the case where a process based on specific information received before a next restricted period will not be completed before the next restricted period starts and where the process will not be completed within the predetermined allowed time period, stores the specific information in a storage medium,
   wherein, after the restricted period ends, a process based on the specific information stored in the storage medium is executed.

4. The processing control apparatus according to claim 1, further comprising:
   a storage unit that, in the case where a process based on specific information received before a next restricted period will not be completed before the next restricted period starts and where the process will not be completed within the predetermined allowed time period, stores the specific information in a storage medium, wherein, after the restricted period ends, a process based on the specific information stored in the storage medium is executed.

5. The processing control apparatus according to claim 1, further comprising:

a notification unit that, in the case where a process based on specific information received before a next restricted period will not be completed before the next restricted period starts and where the process will not be completed within the predetermined allowed time period, notifies a transmission source which has transmitted the information that the information is to be transmitted after the restricted period ends.

6. The processing control apparatus according to claim 1, further comprising:

a subpanel that operates by using power from a storage battery device which is different from and independent of the main power supply and a sub power supply and that includes at least a display unit on which announcement information about the restricted period is displayed.

7. An image processing apparatus comprising:

an image reading unit that reads out a document image;

an image forming unit that forms an image on recording paper on the basis of received information;

a communication circuit unit that receives and transmits image information via a communication network;

a main power supply that supplies power to each of the image reading unit, the image forming unit, and the communication circuit unit;

a process controller that controls execution of a process using at least one of the image reading unit, the image forming unit, and a facsimile communication circuit unit, on the basis of a type of a processing pattern selected from processing patterns including scanning, copying, printing, facsimile transmission, and facsimile reception;

a setting unit that restricts power supply from the main power supply to processors including the image reading unit, the image forming unit, and the communication circuit unit, and that sets a restricted period in which a process in the processors is prohibited from being executed;

a delay unit that, in the case where a specific process which is being executed when the restricted period is to start will be completed within a predetermined allowed time period, delays the time when the restricted period is to start at least until the specific process is completed; and a restart unit that, in the case where the specific process which is being executed when the restricted period is to start will not be completed within the predetermined allowed time period, restarts a remaining process of the specific process after the restricted period ends, the remaining process being generated on the basis of the prohibition of execution of a process in the processors.

8. The image processing apparatus according to claim 7, wherein the information received by the communication circuit unit is print information received from a terminal apparatus via a network or facsimile reception information received from a facsimile communication apparatus via a telephone network.

9. A processing control method comprising:

executing a process with a processor on the basis of received information, by using power supplied from a main power supply;

restricting power supply from the main power supply to the processor and setting a restricted period in which a process is prohibited from being executed in the processor;

in the case where a specific process which is being executed when the restricted period is to start will be completed within a predetermined allowed time period, delaying the time when the restricted period is to start at least until the specific process is completed; and in the case where the specific process which is being executed when the restricted period is to start will not be completed within the predetermined allowed time period, restarting a remaining process of the specific process with a restart unit after the restricted period ends, the remaining process being generated on the basis of the prohibition of execution of a process in the processor.

* * * * *